United States Patent
Li et al.

(10) Patent No.: US 12,242,888 B2
(45) Date of Patent: Mar. 4, 2025

(54) GPU AND GPU METHOD

(71) Applicant: ALIBABA (CHINA) CO., LTD., Zhejiang Province (CN)

(72) Inventors: Haoran Li, Shanghai (CN); Fei Sun, San Jose, CA (US); Yuan Gao, Shanghai (CN)

(73) Assignee: ALIBABA (CHINA) CO., LTD., Zhejiang Province (CN)

( * ) Notice: Subject to any disclaimer, the term of this patent is extended or adjusted under 35 U.S.C. 154(b) by 197 days.

(21) Appl. No.: 18/055,169

(22) Filed: Nov. 14, 2022

(65) Prior Publication Data

US 2023/0367633 A1    Nov. 16, 2023

(30) Foreign Application Priority Data

May 13, 2022   (CN) .......................... 202210522067.6

(51) Int. Cl.
   *G06F 9/48*   (2006.01)
   *G06T 1/20*   (2006.01)

(52) U.S. Cl.
   CPC .............. *G06F 9/4881* (2013.01); *G06T 1/20* (2013.01)

(58) Field of Classification Search
   CPC .... G06F 9/4881; G06F 9/5006; G06F 9/5027; G06F 2209/503; G06F 2209/509; G06T 1/20
   USPC ................. 345/501, 522; 712/9.045; 717/150
   See application file for complete search history.

(56) References Cited

U.S. PATENT DOCUMENTS

| | | | | |
|---|---|---|---|---|
| 2009/0323784 | A1* | 12/2009 | Depienne ............... | H04H 60/80 375/219 |
| 2012/0320070 | A1* | 12/2012 | Arvo ...................... | G06F 9/5033 345/522 |
| 2012/0331278 | A1* | 12/2012 | Breternitz ............. | G06F 9/5027 712/E9.045 |
| 2013/0191817 | A1* | 7/2013 | Vorbach .............. | G06F 15/7807 717/150 |
| 2018/0157471 | A1* | 6/2018 | Venkataramani ..... | G06F 8/4434 |
| 2020/0104134 | A1* | 4/2020 | Tu ........................ | G06F 9/30043 |
| 2023/0039180 | A1* | 2/2023 | Luitjens ................ | G06F 9/4484 |

* cited by examiner

*Primary Examiner* — Prabodh M Dharia
(74) *Attorney, Agent, or Firm* — WPAT, P.C.; Anthony King

(57) ABSTRACT

A GPU and a GPU method are provided. The GPU includes stream multiprocessors, an available hardware resource table, resource comparator, stream scheduler, and global dispatcher. Each stream multiprocessor executes at least one thread block. The available hardware resource table records hardware resources available to the stream multiprocessors. The resource comparator selects from first-priority kernel codes in the kernel streams at least one first dispatchable kernel code whose required hardware resources are less than hardware resources available to the stream multiprocessors according to the available hardware resource table. The stream scheduler selects from the at least one first dispatchable kernel code a kernel code as a selected kernel code. The global dispatcher dispatches thread blocks in the selected kernel code to the stream multiprocessors for execution and updates the available hardware resource table according to usage conditions of hardware resources of the stream multiprocessors.

20 Claims, 5 Drawing Sheets

GPU AND GPU METHOD

CROSS-REFERENCE TO RELATED APPLICATIONS

This application claims priority of China application No. 202210522067.6, filed on May 13, 2022, which is incorporated by reference in its entirety.

BACKGROUND OF THE PRESENT DISCLOSURE

Field of the Present Disclosure

The present disclosure relates to GPUs and, more particularly, to a GPU capable of processing kernel codes in parallel.

DESCRIPTION OF THE PRIOR ART

Graphics processing units (GPUs) are capable of parallel computing and thus are not only applicable to drawing 3D images but also applicable to speeding up AI model or big data analysis which requires plenty parallel computing. In general, GPUs each comprise a plurality of stream multiprocessors (SM). Each stream multiprocessor comprises a plurality of stream processors (SP). The computation executed by a central processing unit (CPU) through a GPU entails packaging the requested computations into kernel codes, with each kernel code comprising a plurality of thread blocks, and each thread block comprising a plurality of warps. In such case, the GPU sequentially dispatches thread blocks in each kernel code to the stream multiprocessors for execution, and the stream processors in each stream multiprocessor can execute the threads of a corresponding warp in parallel. In some cases, to enhance computation performance of the GPU, the CPU may put kernel codes that are independent of each other in different kernel streams, and execute kernel codes in different kernel streams in parallel once the GPU receives the kernel streams. However, the kernel codes in each kernel stream still have to be executed in a fixed sequence, and some different kernel codes may compete for hardware resources of the same type. Thus, it is rather difficult for the GPU to schedule the kernel codes and effectively increase the hardware utilization rate of the GPU. Therefore, it is imperative to dispatch kernel codes in kernel streams in a way to enhance overall computation efficiency of the GPU.

SUMMARY OF THE PRESENT DISCLOSURE

In view of the aforesaid drawbacks of the prior art, it is an objective of the disclosure to provide a GPU and a GPU method.

An embodiment of the disclosure provides a GPU for executing kernel streams. Each of the kernel streams comprises a plurality of kernel codes to be sequentially executed, and each of the kernel codes comprises a plurality of thread blocks. The GPU comprises stream multiprocessors, an available hardware resource table, a resource comparator, a stream scheduler and a global dispatcher. Each stream multiprocessor executes at least one thread block. The available hardware resource table records hardware resources available to the stream multiprocessors. The resource comparator selects from first-priority kernel codes in the kernel streams at least one first dispatchable kernel code whose required hardware resources are less than hardware resources available to the stream multiprocessors according to the available hardware resource table. The stream scheduler selects from the at least one first dispatchable kernel code a kernel code as a selected kernel code. The global dispatcher dispatches thread blocks in the selected kernel code to the stream multiprocessors for execution and updates the available hardware resource table according to usage conditions of the hardware resources of the stream multiprocessors.

Another embodiment of the disclosure provides a GPU method for executing kernel streams. Each of the kernel streams comprises a plurality of kernel codes to be sequentially executed, and each of the kernel codes comprises a plurality of thread blocks. The method comprises the steps of: recording hardware resources available to stream multiprocessors in an available hardware resource table; selecting from first-priority kernel codes in the kernel streams at least one first dispatchable kernel code whose required hardware resources are less than hardware resources available to the stream multiprocessors according to the available hardware resource table; selecting from the at least one first dispatchable kernel code a kernel code as a selected kernel code; dispatching thread blocks in the selected kernel code to the stream multiprocessors for execution; and updating the available hardware resource table according to usage conditions of hardware resources of the stream multiprocessors.

DETAILED DESCRIPTION OF THE EMBODIMENTS

Figure 1:
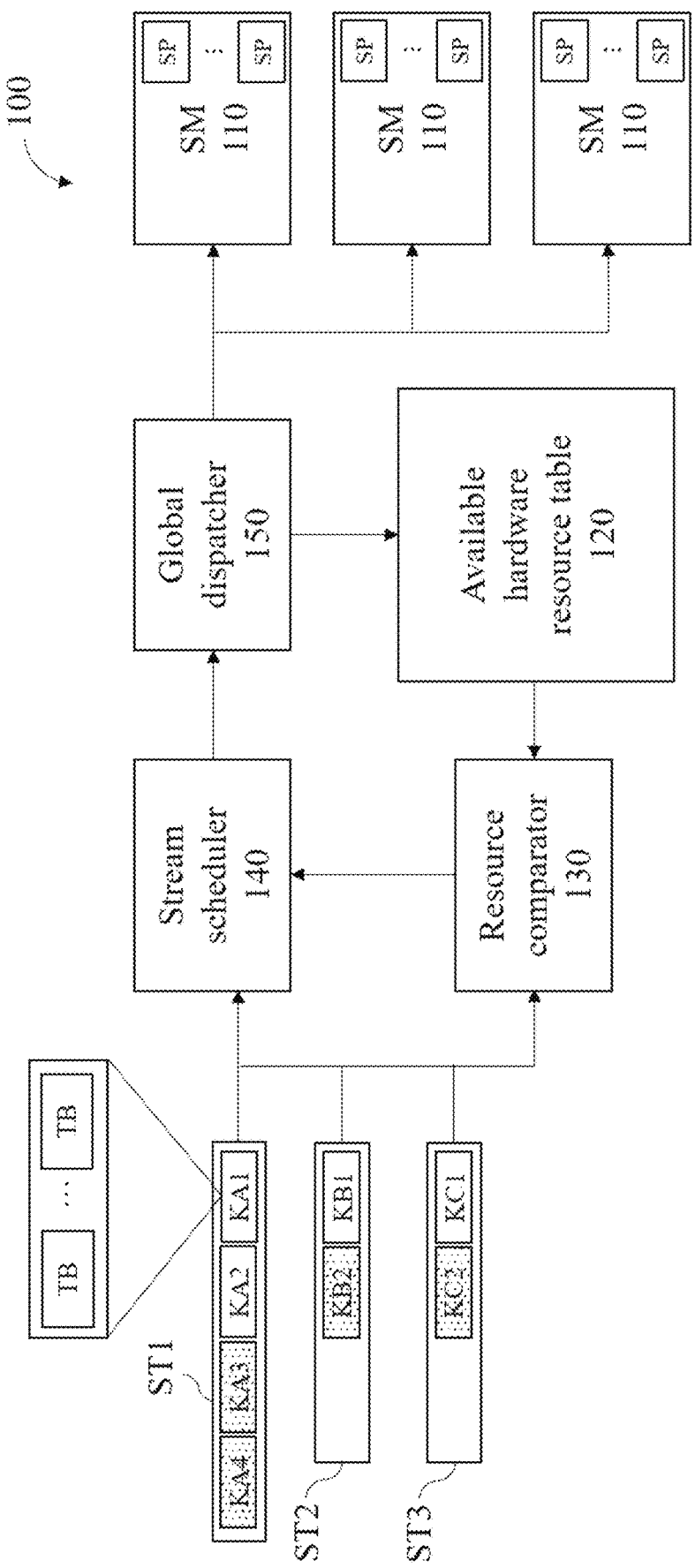
FIG. 1 is a schematic view of a GPU according to one embodiment of the disclosure.

The following disclosure provides various different embodiments or examples for implementing different features of the present disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various embodiments. This repetition is for the purpose of simplicity and clarity and does not in itself dictate a relationship between the various embodiments and/or configurations discussed.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "generally" means within an acceptable standard error of the mean when considered by one of ordinary skill in the art. As could be appreciated, other than in the operating/working examples, or unless otherwise expressly specified, all of the numerical ranges, amounts, values, and percentages (such as those for quantities of materials, duration of times, temperatures, operating conditions, portions of amounts, and the likes) disclosed herein should be understood as modified in all instances by the term "generally." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Here, ranges can be expressed herein as from one endpoint to another endpoint or between two endpoints. All ranges disclosed herein are inclusive of the endpoints, unless specified otherwise.

FIG. 1 is a schematic view of a graphics processing unit (GPU) 100 according to one embodiment of the disclosure. The GPU 100 may include a plurality of stream multiprocessors 110, an available hardware resource table 120, a resource comparator 130, a stream scheduler 140, and a global dispatcher 150. In the present embodiment, the GPU 100 is applicable to computer systems, such as data centers, cloud servers, smartphones, notebook computers, and desktop computers, and is adapted to execute computation to be performed by the computer systems. For instance, when a central processing unit (CPU) in a computer system needs to use a GPU to execute computation, the CPU packages the computation to be executed in forms of kernel codes and puts kernel codes that are independent of each other in different kernel streams; thus, the GPU 100 may schedule and dispatch kernel codes in the kernel streams and may execute kernel codes in different kernel streams in parallel.

For instance, as shown in FIG. 1, the GPU 100 may receive three kernel streams ST1, ST2 and ST3, and each of the kernel streams ST1 toto ST3 may comprise a pluraiy of kernel codes. The kernel stream ST1 comprises kernel codes KA1, KA2, KA3 and KA4. The kernel stream ST2 comprises kernel codes KB1 and KB2. The kernel stream ST2 comprises kernel codes KC1 and KC2. In addition, each of the kernel codes KA1, KA2, KA3 and KA4 may include a plurality of thread blocks TB.

In the present embodiment, kernel codes in each kernel stream need to be execute sequentially. For instance, in the kernel stream ST1, the kernel code KA2 can only be dispatched after the kernel code KA1 is dispatched, and the kernel code KA3 can only be dispatched after the kernel code KA2 is dispatched, and so on. In the present embodiment, hardware resources required for kernel codes vary from kernel code to kernel code, depending on the content of operations involved in the kernel codes. For instance, the kernel codes KA1, KA2 in the kernel stream ST1, the kernel code KB1 in the kernel stream ST2, and the kernel code KC1 in the kernel stream ST3 may be kernel codes of a first type (and are shown as blocks with white background in FIG. 1), and their required hardware resources are, for example, 70% of hardware resources of a first type available to stream multiprocessors 110 and 30% of hardware resources of a second type available to stream multiprocessors 110. By contrast, the kernel codes KA3, KA4 in the kernel stream ST1, the kernel code KB2 in the kernel stream ST2, and the kernel code KC2 in the kernel stream ST3 may be kernel codes of the second type (and are shown as blocks with shaded background in FIG. 1), and their required hardware resources are, for example, 20% of hardware resources of the first type available to stream multiprocessors 110 and 60% of the hardware resources of the second type available to stream multiprocessors 110. In some embodiments, the hardware resources of the first type may be, for example, register file shared by stream multiprocessors 110, and the hardware resources of the second type may be, for example, random-access memory shared by stream multiprocessors 110. In some embodiments, the hardware resources available to each stream multiprocessors 110 may further include stream processors SP therein.

In such case, the hardware resources required for kernel codes of the first type differ from and complement the hardware resources required for kernel codes of the second type. That is, a kernel code of one type of these two types may have greater demand for the hardware resources of the first type, and a kernel code of the other type may have less demand for the hardware resources of the first type; however, a total hardware resource demand of these two kernel codes of different types does not exceed a total hardware resources provided by the GPU. Thus, ideally, the GPU can execute these two types of kernel codes simultaneously. However, if kernel codes in the kernel streams ST1 to ST3 are dispatched in a round-robin fashion, it may often result in that the stream processors of the GPU may not have sufficient hardware resources to execute the dispatched kernel code in their turns and need to wait, thereby causing a low overall hardware utilization rate of the GPU.

Figure 2:
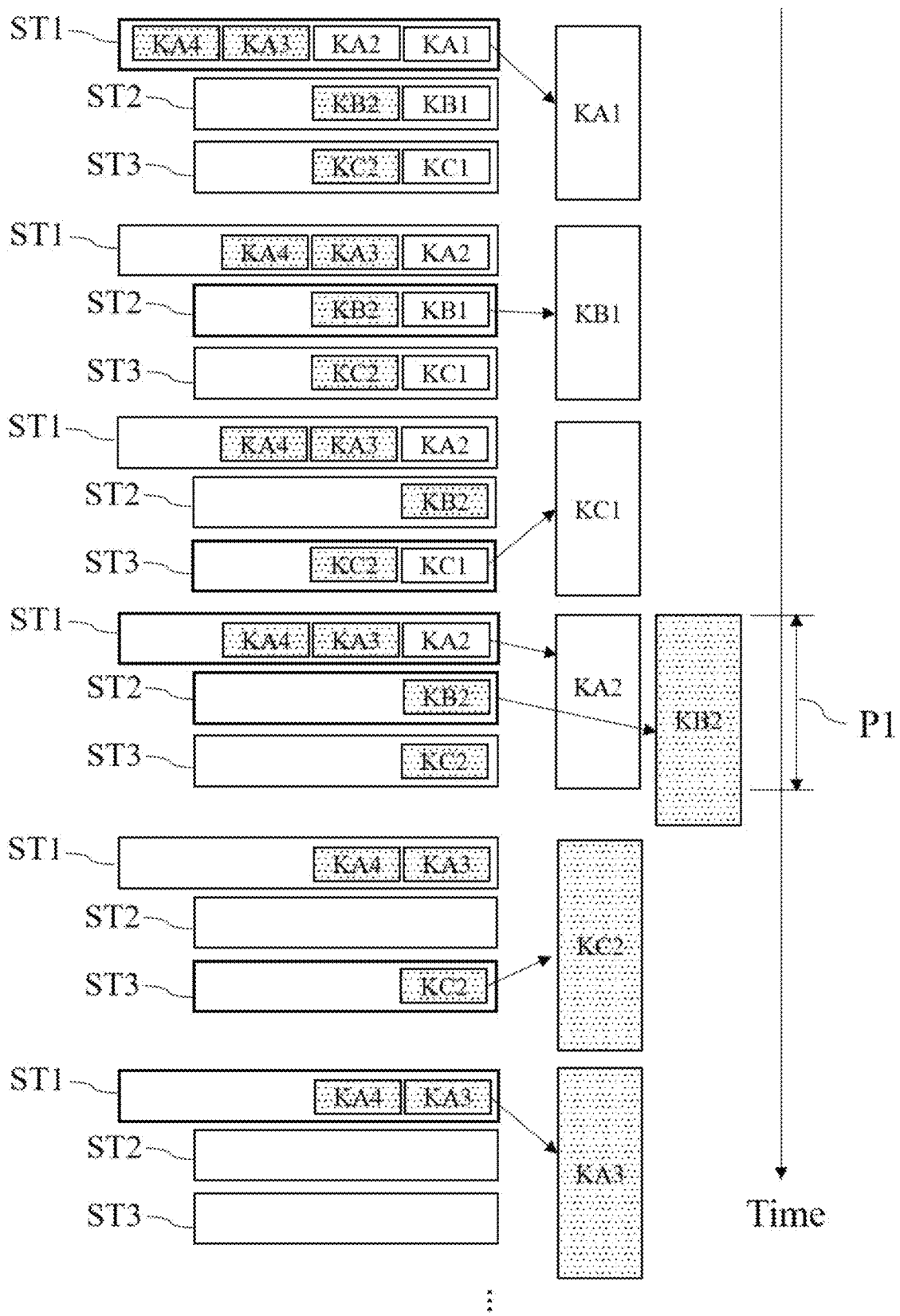
FIG. 2 is a timing diagram of dispatching kernel codes in kernel streams in a round-robin fashion.

FIG. 2 is a timing diagram of dispatching kernel codes in the kernel streams ST1 to ST3 in a round-robin fashion. As shown in FIG. 2, a dispatcher of the GPU sequentially visits the kernel streams ST1, ST2 and ST3 to sequentially execute kernel codes in the kernel streams. For instance, the dispatcher visits the kernel stream ST1 first. At this point in time, no kernel codes have been dispatched, so the hardware resources in the GPU are sufficient to execute the first-priority kernel code KA1 in the kernel stream ST1. Thus, the dispatcher dispatches the kernel code KA1 to a corresponding stream multiprocessor for execution. Then, by the round-robin principle, the dispatcher visits the kernel stream ST2. By this point in time, the kernel code KA1 has taken up 70% of the hardware resources of the first type and 30% of the hardware resources of the second type in the GPU. Thus, there are no sufficient hardware resources to execute the first-priority kernel code KB1 in the kernel stream ST2. In such case, the GPU may need to wait for the execution of the kernel code KA1 to finish before it can execute the kernel code KB1.

Similarly, after dispatching the kernel code KB1 of the kernel stream ST2, the dispatcher visits the kernel stream ST3. By this point in time, the kernel code KB1 has taken up 70% of the hardware resources of the first type and 30% of the hardware resources of the second type in the GPU. Thus, there are no sufficient hardware resources to execute the first-priority kernel code KC1 in the kernel stream ST3. In such case, it is only after the kernel code KB1 has been executed that the GPU can execute the kernel code KC1. As shown in FIG. 2, although the GPU has sufficient hardware resources to process two kernel codes of different types simultaneously, the GPU may, in the situation that the kernel streams are visited in the round-robin fashion, execute the kernel code KA2 of the kernel stream ST1 and the kernel code KB2 of the kernel stream ST2 simultaneously only during a period P1 and may execute only one single kernel code during other periods. As a result, the overall hardware utilization rate is rather low, and the computation performance of the GPU is poor.

To enhance the hardware utilization rate and computation performance of the GPU, the GPU 100 of the present disclosure can flexibly schedules kernel codes in the kernel streams ST1 to ST3 by adopting the available hardware resource table 120, resource comparator 130, stream scheduler 140 and global dispatcher 150.

Figure 3:
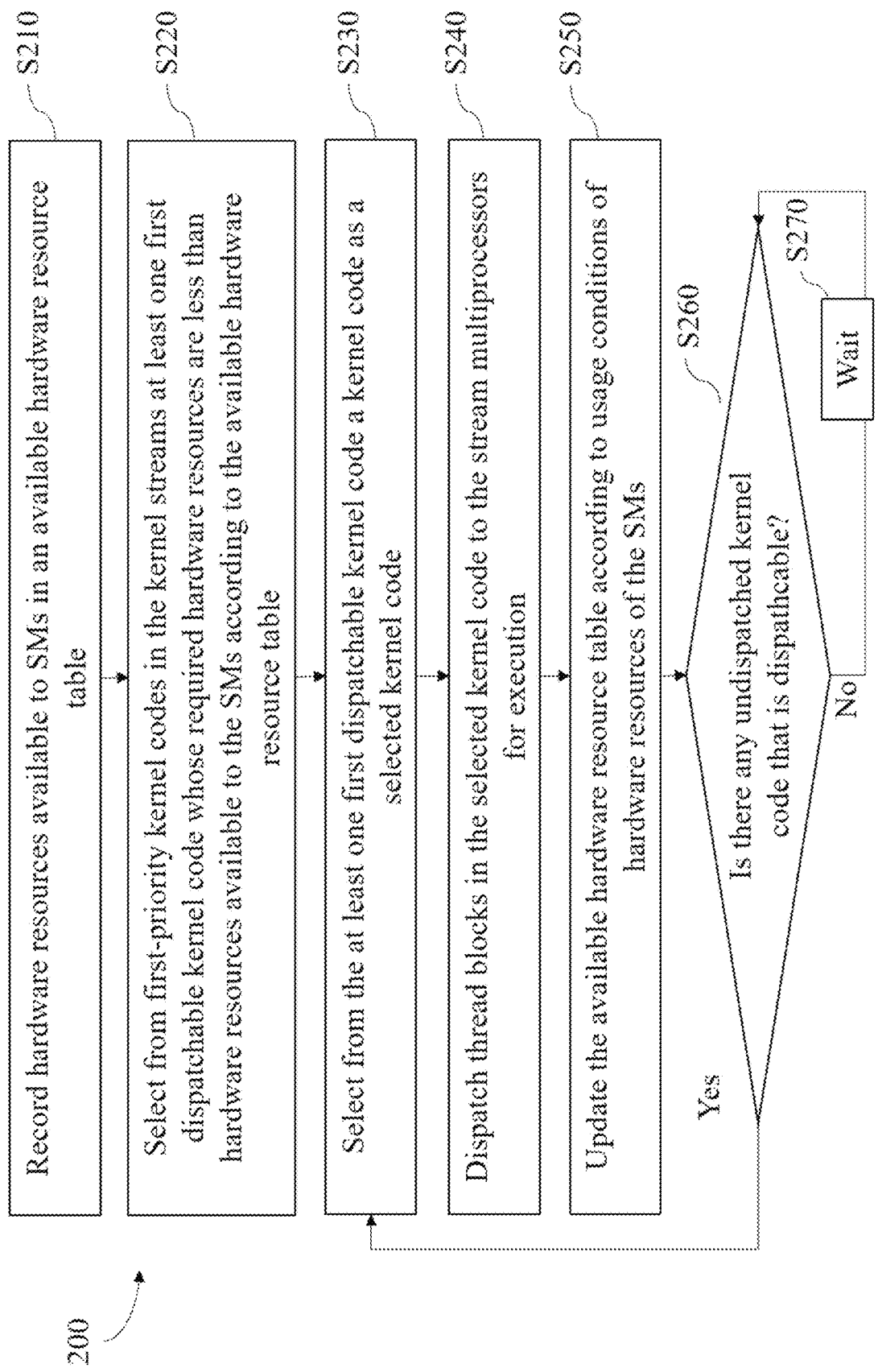
FIG. 3 is a flowchart of a GPU method according to one embodiment of the disclosure.
Figure 4:
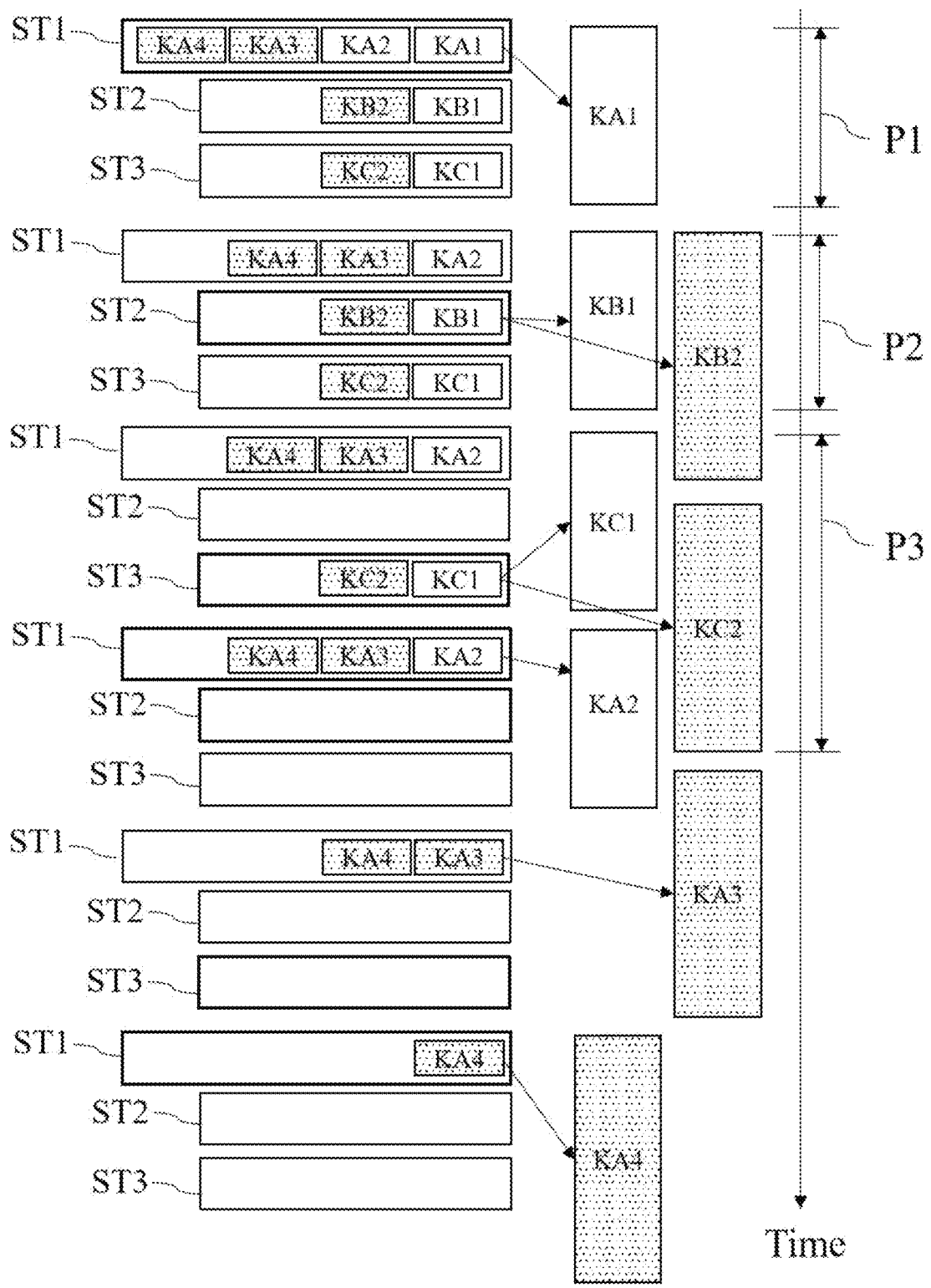
FIG. 4 is a timing diagram of dispatching kernel codes in kernel streams with the method illustrated in FIG. 3.

FIG. 3 is a flowchart of a GPU method 200 according to one embodiment of the disclosure. In the present embodiment, the GPU 100 can perfrom the method 200. The method 200 may comprise steps S210 to S250. FIG. 4 is a timing diagram of dispatching kernel codes in the kernel streams ST1 to ST3 according to the method 200.

In step S210, the GPU 100 can record the hardware resources available to the stream multiprocessors 110 in the available hardware resource table 120. For instance, the hardware resources available to each stream multiprocessors 110 may include stream processors therein, a register file and at least one memory. In the present embodiment, the register file and the memory can be used to store data or instructions required for the stream processors to execute threads or temporarily store data generated in the course of computation. However, the disclosure is not limited thereto. In some other embodiments, the hardware resources available to the stream multiprocessors 110 may further include any other types of hardware, such as cache. In step S220, the resource comparator 130 selects from the first-priority kernel codes KA1, KB1 and KC1 in the kernel streams ST1 to ST3 at least one dispatchable kernel code whose required hardware resources are less than the hardware resources available to the stream multiprocessors 110 according to the available hardware resource table 120. In the present embodiment, prior to the period P1 in FIG. 4, the GPU has not yet executed any kernel code, so in step S220, the hardware resources available to the stream multiprocessors 110 are sufficient to execute any one of the kernel codes KA1, KB1 and KC1. In such case, the resource comparator 130 may select the kernel codes KA1, KB1 and KC1 as dispatchable kernel codes. That is, the GPU 100 may determine to dispatch any of the kernel codes KA1, KB1 and KC1 in the kernel streams ST1, ST2 and ST3 according to the method 200 without obeying the fixed sequences limited by the round-robin principle and dispatches the kernel codes in the kernel streams ST1, ST2 and ST3 in turn.

In step S230, the stream scheduler 140 may select one kernel code from the dispatchable kernel codes selected in step S220 as the selected kernel code. In step S240, the global dispatcher 150 can dispatches the kernel code selected in step S230 to the stream multiprocessors 110 for execution.

In the present embodiment, to optimize the hardware utilization rate and computation performance of the GPU 100, the GPU 100 may select a kernel code that should be executed first as the selected kernel codes according to the awaiting time required for the current dispatchable kernel codes KA1, KB1 and KC1, the hardware resources required for the current dispatchable kernel codes KA1, KB1 and KC1, and/or priority rankings given by users to the kernel streams.

Figure 5:
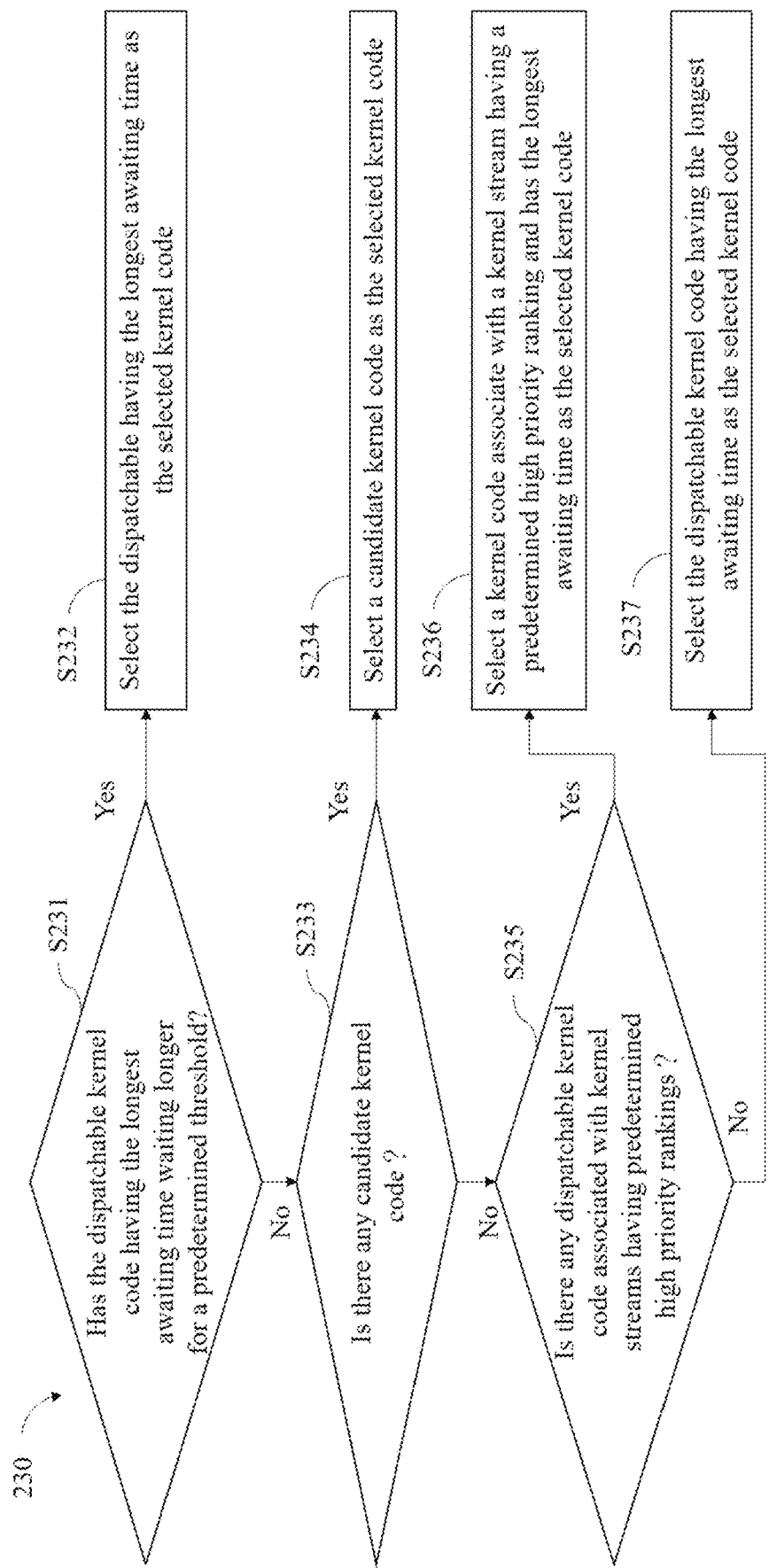
FIG. 5 is a flowchart of sub-steps of the method illustrated in FIG. 3.

FIG. 5 is a flowchart of sub-steps of step S230 of the disclosure. As shown in FIG. 5, step S230 may include sub-steps S231 to S237. In sub-step S231, the stream scheduler 140 can determine whether the awaiting time of a dispatchable kernel code that has longest awaiting time among the dispatchable kernel codes is greater than a predetermined threshold. If the determination result in sub-step S231 is in the affirmative, the stream scheduler 140 executes sub-step S232 to give priority to selecting the dispatchable kernel code having the longest awaiting time as the selected kernel code, so as to avoid overly long awaiting time of such dispatchable kernel code and resultant execution delays thereof.

However, if the determination result in sub-step S231 is in the negative, it means that there are not any kernel codes which have to be executed immediately, and the stream scheduler 140 may select kernel code that is most appropriate as the selected kernel code according to the hardware resources required for the dispatchable kernel codes and the priority rankings given by users.

For instance, the source comparator 130 can further select, according to the available hardware resource table 120, from the dispatchable kernel codes KA1, KB1 and KC1 at least one kernel code whose required hardware resources match the hardware resources available to the stream multiprocessors 110 to the greatest extent as a candidate kernel code. In the present embodiment, the criterion that the hardware resources required for kernel codes match the hardware resources available to the stream multiprocessors 110 to the greatest extent means that the kernel codes are able to make the best use of the currently remaining hardware resources. For example, if the hardware resources currently available to the stream multiprocessors 110 include 30% of the hardware resources of the first type and 60% of the hardware resources of the second type, the resource comparator 130 will give priority to selecting the dispatchable kernel codes which have greater demands for the hardware resources of the first type and have less demands for the hardware resources of the second type as the selected kernel codes. However, the disclosure is not limited thereto. In some other embodiments, the resource comparator 130 may select, according to the available hardware resource table 120, from the first-priority kernel codes at least one kernel code that requires the least hardware resources as a candidate kernel code. Consequently, in the situation where most of the kernel codes require rather few hardware resources, a chance of simultaneous execution of different kernel codes by the GPU 100 can be increased, thereby enhancing the hardware utilization rate of the GPU 100.

In the situation where the resource comparator 130 has selected a candidate kernel code, the stream scheduler 140 may first select the candidate kernel code suggested by the resource comparator 130 in sub-step S234 as the selected kernel codes. However, in some situations, the resource comparator 130 may not be able to select any candidate kernel code according to the demand for the hardware resources. For example, in the situation where the GPU has not been used to execute any kernel codes or all the dispatchable kernel codes require the same hardware resources, it is rather difficult for the resource comparator 130 to select the most appropriate candidate kernel code. In such case, the stream scheduler 140 may further execute sub-step S235 according to the priority rankings of the kernel streams carrying the kernel codes and their awaiting time.

In sub-step S235, the stream scheduler 140 determines whether a dispatchable kernel codes is associated with a kernel stream having a predetermined high priority ranking. In the present embodiment, the GPU 100 allows users to define a priority ranking of each kernel stream generated by the CPU according to the importance level of the kernel stream, such that the GPU may give priority to processing kernel streams with high priority rankings. Therefore, when the stream scheduler 140 determines that there are dispatchable kernel codes associated with kernel streams having predetermined high priority rankings, sub-step S236 can be executed to select a dispatchable kernel code having the longest awaiting time and associated with a kernel stream having a predetermined high priority rankings the selected kernel code. For instance, if the kernel stream ST1 is configured to have a high priority ranking, but the kernel streams ST2 and ST3 are not configured to have high priority rankings, the stream scheduler 140 in sub-step S236 may select the dispatchable kernel code KA1 associated with the kernel stream ST1 as the selected kernel code.

However, in the absence of dispatchable kernel codes associated with kernel streams having high priority rankings (for example, when all the kernel streams ST1, ST2 and ST3 are not configured to have high priority rankings) the stream scheduler 140 may perform sub-step S237 to select the dispatchable kernel code having the longest awaiting time as the selected kernel code.

In the present embodiment, the stream scheduler 140 in step S230 may select the kernel code KA1 as the selected kernel code, and the global dispatcher 150 in step S240 may dispatch the kernel code KA1 to corresponding stream multiprocessors 110. In general, each kernel code may include a plurality of thread blocks. Therefore, to perform a dispatching process, the global dispatcher 150 may dispatch one thread block at a time to the corresponding stream multiprocessors 110, and each stream multiprocessors 110 may execute at least one thread block.

After the kernel code KA1 has been dispatched to each stream multiprocessors 110, the stream multiprocessors 110 executing respective thread blocks take up the hardware resources otherwise available. Thus, in step S250, the global dispatcher 150 can update the available hardware resource table 120 according to the hardware resources available to the stream multiprocessors 110 having been dispatched to execute the kernel code KA1, so as to facilitate the next instance of dispatching kernel codes.

In some embodiments, after generating kernel streams, the CPU creates in each kernel code a hardware resource table required for the kernel code to record the hardware resources required for each thread block in each kernel code. Thus, the global dispatcher 150 dispatches each kernel code and thus is informed of the hardware resources to be taken up by each said kernel code, thereby allowing the available hardware resource table 120 to be updated accordingly. Furthermore, in step S220, the resource comparator 130 can determine whether the hardware resources required for the first-priority kernel codes KA1, KB1 and KC1 are less than the hardware resources available to the stream multiprocessors 110 according to the available hardware resource table 120 and the hardware resource tables required for the first-priority kernel codes KA1, KB1 and KC1.

After the kernel code KA1 has been dispatched to the corresponding stream multiprocessors 110 and executed, the GPU 100 can carry out step S260 to determine whether there are, dispatchable kernel codes that are still undispatched so as to continue with scheduling. In the present embodiment, although the kernel streams ST1, ST2 and ST3 still have undispatched kernel codes, hardware resources required for the first-priority kernel codes KA2, KB1 and KC1 currently located in the kernel streams ST1, ST2 and ST3 are all greater than hardware resources currently available to the stream multiprocessors 110 before the execution of the kernel code KA1 is finished. Thus, the GPU 100 has to wait for the completion of execution of the kernel code KA1 and the release of hardware resources before carrying out step S230 again to select the next selected kernel code from the dispatchable kernel codes KA2, KB1 and KC1 in the kernel streams ST1, ST2 and ST3.

As shown in FIG. 4, during a period P2, the stream scheduler 140 may select the kernel code KB1 as the selected kernel code and dispatches the kernel code KB1 to the stream multiprocessors 110. In such case, 70% of the hardware resources of the first type available to the stream multiprocessors 110 are to be taken up, and 30% of the hardware resources of the second type available to the stream multiprocessors 110 are to be taken up. Thus, the available hardware resources remaining would include only 30% of the hardware resources of the first type and 70% of the hardware resources of the second type. In such case, the hardware resources required for the first-priority kernel codes KA2 and KC1 in the kernel streams ST1 and ST3 are currently greater than the hardware resources available to the stream multiprocessors 110; however, the kernel code KB2 that follows the previous kernel code KB1 will obtain the first priority in the kernel stream ST2, and its required hardware resources include 20% of the hardware resources of the first type and 60% of the hardware resources of the second type. That is, when the stream multiprocessors 110 execute the kernel code KB1, the stream multiprocessors 110 may still have sufficient hardware resources to execute the kernel code KB2. Therefore, as shown in FIG. 4, during the period P2 in which the kernel code KB1 is executed, the stream scheduler 140 may further select the kernel code KB2 as the selected kernel code and dispatch it to the stream multiprocessors 110 for execution.

That is, after the global dispatcher 150 has dispatched the selected kernel code KB1 to the stream multiprocessors 110 for execution, the resource comparator 130 can not only determine whether the hardware resources required for the first-priority, undispatched kernel codes KA2 and KC1 are less than the hardware resources available to the stream multiprocessors 110 according to the updated available hardware resource table 120, but also determine whether the hardware resources required for the kernel code KB2, which is located in the same kernel stream ST2 as the kernel code KB1 and adapted to substitute for the kernel code KB1 to gain first priority, are less than the hardware resources available to the stream multiprocessors 110, so as to select dispatchable kernel codes.

As shown in FIG. 4, after the kernel code KB2 has been dispatched, it is only when the execution of the kernel code KB1 is completed that the stream scheduler 140 will have sufficient hardware resources to execute the kernel code KC1 or KA2. During a period P3, after the kernel code KB1 has been completely executed, the stream scheduler 140 may give priority to selecting the kernel code KC1 (because the kernel code KC1 has longer awaiting time than the kernel code KA2) as the selected kernel code, and the global dispatcher 150 would dispatch the kernel code KC1 to the stream multiprocessors 110. Then, upon completion of execution of the kernel code KB2, the hardware resources available to the stream multiprocessors 110 are sufficient to execute the kernel code KC2; thus, the stream scheduler 140 may select the kernel code KC2 as the selected kernel code, and the global dispatcher 150 would dispatches the kernel code KC2 to the stream multiprocessors 110. That is, during part of the period P3, the GPU 100 can simultaneously execute the kernel code KC1 and the kernel code KC2.

The method 200 entails selecting from the first-priority kernel codes in the kernel streams ST1, ST2 and ST3 appropriate kernel codes first for dispatching; therefore, the chance that the GPU 100 simultaneously executes kernel codes can be increased, as shown in FIG. 4. For instance, the stream scheduler 140 may select a kernel code as the selected kernel code, when the kernel code requires the least hardware resources, has its required hardware resources matching its available hardware resources to the greatest extent, or has the longest awaiting time, thereby enhancing the hardware utilization rate and overall computation performance of the GPU 100.

Furthermore, the disclosure is not restricted to simultaneous execution of thread blocks in only two kernel codes by the stream multiprocessors 110 in the GPU 100. In some embodiments, if some kernel codes require rather few hardware resources, the stream multiprocessors 110 in the GPU 100 may simultaneously execute more than two kernel codes.

In conclusion, the GPU and the GPU method provided in embodiments of the disclosure involve receiving kernel streams, and selecting an appropriate one of first-priority kernel codes in kernel streams for dispatching, for example, selecting a kernel code as the selected kernel code, when the kernel code requires the least hardware resources, has its required hardware resources matching its available hardware resources to the greatest extent, or has the longest awaiting time, thereby enhancing the hardware utilization rate and overall computation performance of the GPU.

The foregoing description briefly sets forth the features of certain embodiments of the present application so that persons having ordinary skill in the art more fully understand the various aspects of the disclosure of the present application. It will be apparent to those having ordinary skill in the art that they can easily use the disclosure of the present application as a basis for designing or modifying other processes and structures to achieve the same purposes and/or benefits as the embodiments herein. It should be understood by those having ordinary skill in the art that these equivalent implementations still fall within the spirit and scope of the disclosure of the present application and that they may be subject to various variations, substitutions, and alterations without departing from the spirit and scope of the present disclosure.

What is claimed is:

1. A GPU for executing kernel streams, each of the kernel streams comprising a plurality of kernel codes to be sequentially executed, each of the kernel codes comprising a plurality of thread blocks, the GPU comprising:
   stream multiprocessors each configured to execute at least one thread block;
   an available hardware resource table configured to record hardware resources available to the stream multiprocessors;
   a resource comparator configured to select from first-priority kernel codes in the kernel streams at least one first dispatchable kernel code whose required hardware resources are less than hardware resources available to the stream multiprocessors according to the available hardware resource table;
   a stream scheduler configured to select from the at least one first dispatchable kernel code a kernel code as a selected kernel code; and
   a global dispatcher configured to dispatch thread blocks in the selected kernel code to the stream multiprocessors for execution and update the available hardware resource table according to usage conditions of hardware resources of the stream multiprocessors.

2. The GPU of claim 1, wherein each of the kernel codes further comprises a required hardware resource table for recording hardware resources required for each thread block thereof, and wherein the resource comparator determines whether hardware resources required for the first-priority kernel codes are less than the hardware resources available to the stream multiprocessors according to the available hardware resource table and required hardware resource tables of the first-priority kernel codes.

3. The GPU of claim 1, wherein the stream scheduler gives priority to selecting a first dispatchable kernel code having longest awaiting time among the at least one dispatchable kernel code as the selected kernel code when an awaiting duration of the first dispatchable kernel code having the longest awaiting time is greater than a predetermined threshold.

4. The GPU of claim 1, wherein the resource comparator further selects from the at least one first dispatchable kernel code a kernel code whose required hardware resources match the hardware resources available to the stream multiprocessors to the greatest extent as a candidate kernel code according to the available hardware resource table.

5. The GPU of claim 1, wherein the resource comparator further selects from the at least one first dispatchable kernel code a kernel code requiring the least hardware resources as a candidate kernel code according to the available hardware resource table.

6. The GPU of claim 5, wherein the stream scheduler gives priority to selecting the candidate kernel code as the selected kernel code when an awaiting duration of a first dispatchable kernel code having a longest awaiting time among the at least one dispatchable kernel is less than a predetermined threshold.

7. The GPU of claim 1, wherein, when an awaiting duration of a first dispatchable kernel code having a longest awaiting time among the at least one dispatchable kernel is less than a predetermined threshold, the stream scheduler gives priority to selecting the first dispatchable kernel code having a longest awaiting time among first dispatchable kernels associated with a kernel stream having a predetermined high priority ranking as the selected kernel code.

8. The GPU of claim 1, wherein, during at least one period, the stream multiprocessors simultaneously process a plurality of thread blocks from at least two kernel codes.

9. The GPU of claim 1, wherein, after the global dispatcher has dispatched the selected kernel code to the stream multiprocessors for execution, the resource comparator selects, according to the available hardware resource table being updated, from undispatched kernel codes among the at least one first-priority kernel code and kernel codes following the selected kernel code in a kernel stream initially associated with the selected kernel code at least one second dispatchable kernel code whose required hardware resources are less than hardware resources available to the stream multiprocessors.

10. The GPU of claim 1, wherein hardware resources of each of the stream multiprocessors comprise a plurality of stream processors, a register file and at least one memory, wherein the register file and the at least one memory are configured to store data and/or instructions required for the stream processors to execute threads.

11. A GPU method for executing kernel streams, each of the kernel streams comprising a plurality of kernel codes to be sequentially executed, each of the kernel codes comprising a plurality of thread blocks, the method comprising the steps of:
   recording hardware resources available to stream multiprocessors in an available hardware resource table;
   selecting from first-priority kernel codes in the kernel streams at least one first dispatchable kernel code whose required hardware resources are less than hardware resources available to the stream multiprocessors according to the available hardware resource table;

selecting from the at least one first dispatchable kernel code a kernel code as a selected kernel code;

dispatching thread blocks in the selected kernel code to the stream multiprocessors for execution; and updating the available hardware resource table according to usage conditions of hardware resources of the stream multiprocessors.

12. The method of claim 11, further comprising the steps of:

recording hardware resources required for each thread block in each of the kernel codes in a required hardware resource table of each of the kernel codes when generating the kernel streams; and determining whether hardware resources required for the first-priority kernel codes are less than the hardware resources available to the stream multiprocessors according to the available hardware resource table and a required hardware resource table of the first-priority kernel codes.

13. The method of claim 11, wherein the step of selecting from the at least one first dispatchable kernel code a kernel code as the selected kernel code comprises giving priority to selecting a first dispatchable kernel code having a longest awaiting time among the at least one dispatchable kernel code as the selected kernel code when an awaiting duration of the first dispatchable kernel code having the longest awaiting time is greater than a predetermined threshold.

14. The method of claim 11, further comprising the step of selecting from the first-priority kernel codes a kernel code whose required hardware resources match hardware resources available to the stream multiprocessors to the greatest extent as a candidate kernel code according to the available hardware resource table.

15. The method of claim 11, further comprising the step of selecting from the first-priority kernel codes a kernel code requiring the least hardware resources as a candidate kernel code according to the available hardware resource table.

16. The method of claim 15, wherein the step of selecting from the at least one first dispatchable kernel code a kernel code as the selected kernel code comprises giving priority to selecting the candidate kernel code as the selected kernel code when an awaiting duration of a first dispatchable kernel code having a longest awaiting time among the at least one dispatchable kernel is less than a predetermined threshold.

17. The method of claim 11, wherein the step of selecting from the at least one first dispatchable kernel code a kernel code as the selected kernel code comprises when an awaiting duration of a first dispatchable kernel code having a longest awaiting time among the at least one dispatchable kernel is less than a predetermined threshold, giving priority to selecting a first dispatchable kernel code having a longest awaiting time among first dispatchable kernels associated with a kernel stream having a predetermined high priority ranking as the selected kernel code.

18. The method of claim 11, wherein, during at least one period, the stream multiprocessors simultaneously process a plurality of thread blocks from at least two different kernel codes, respectively.

19. The method of claim 11, further comprising, after the global dispatcher has dispatched the selected kernel code to the stream multiprocessors for execution, selecting, according to the available hardware resource table being updated, from undispatched kernel codes among the at least one first-priority kernel code and kernel codes following the selected kernel code in a kernel stream initially associated with the selected kernel code at least one second dispatchable kernel code whose required hardware resources are less than hardware resources available to the stream multiprocessors.

20. The method of claim 11, wherein hardware resources of each of the stream multiprocessors comprise a plurality of stream processors, a register file and at least one memory, wherein the register file and the at least one memory store data and/or instructions required for the stream processors to execute threads.

* * * * *